United States Patent [19]

Deffontaines et al.

[11] Patent Number: 5,570,240
[45] Date of Patent: Oct. 29, 1996

[54] TRANSFLECTIVE COLOUR FILTER, AND A METHOD OF MANUFACTURING SUCH A FILTER

[75] Inventors: Christophe Deffontaines, Cergy; Ambroise Parker, Rueil-Malmaison; Daniel Lecat, Argenteuil, all of France

[73] Assignee: Societe d'Applications Generales d'Electricite et Mecanique-Sagem, Paris, France

[21] Appl. No.: 151,171

[22] Filed: Nov. 12, 1993

[30] Foreign Application Priority Data

Nov. 24, 1992 [FR] France .................................. 92 14117

[51] Int. Cl.⁶ .............................. G02B 5/20; G02B 5/22; G09F 13/04; G03C 7/24
[52] U.S. Cl. ......................... 359/887; 359/885; 359/588; 359/589; 40/580; 430/140
[58] Field of Search ...................... 359/887, 885, 359/891, 890, 588, 589; 430/140, 228, 13, 14, 16; 40/541, 579, 580, 577; 362/23, 29

[56] References Cited

U.S. PATENT DOCUMENTS

| | | | |
|---|---|---|---|
| 3,679,290 | 7/1972 | Adams et al. | 359/887 |
| 4,056,397 | 11/1977 | Krafft et al. | 430/228 |
| 4,102,683 | 7/1978 | DiPiazza | 359/589 |
| 4,139,262 | 2/1979 | Mahlein et al. | 359/885 |
| 4,208,210 | 1/1980 | Sakai et al. | 430/140 |
| 4,288,510 | 9/1981 | Tinet et al. | 430/16 |
| 4,806,774 | 2/1989 | Lin et al. | 382/31 |
| 5,042,920 | 8/1991 | Yoshino et al. | 359/891 |

FOREIGN PATENT DOCUMENTS

| | | | |
|---|---|---|---|
| 343079 | 5/1989 | European Pat. Off. . | |
| 341348 | 11/1989 | European Pat. Off. . | |
| 2926189 | 1/1980 | Germany . | |
| 0034891 | 2/1990 | Japan | 40/580 |
| 403282502 | 12/1991 | Japan | 359/588 |
| 2171118 | 9/1986 | United Kingdom . | |

*Primary Examiner*—Paul M. Dzierzynski
*Assistant Examiner*—Mohammad Y. Sikder
*Attorney, Agent, or Firm*—Larson and Taylor

[57] ABSTRACT

A transflective optical filter comprises a single transparent or transluscent substrate; a colored slice made up of a plurality of layers, each corresponding to one color out of at least two colors; a light diffusing layer; and an opaque mask on which the marks to be displayed in color are represented by transparent zones, the colored slice and the mask consisting of photographic emulsions. A method for making that filter involves multiple exposures of a same film having a multicolored "slice" and a monochrome photosensitive layer.

6 Claims, 1 Drawing Sheet

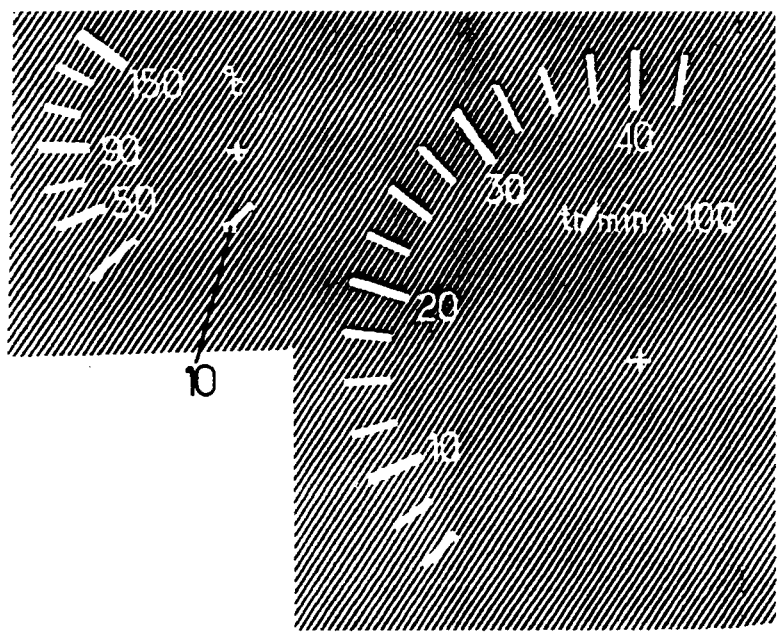
FIG.1.
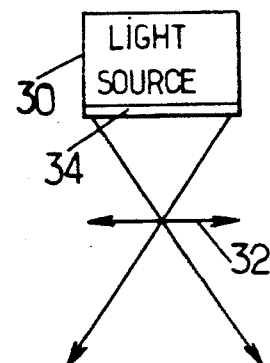
FIG.2.
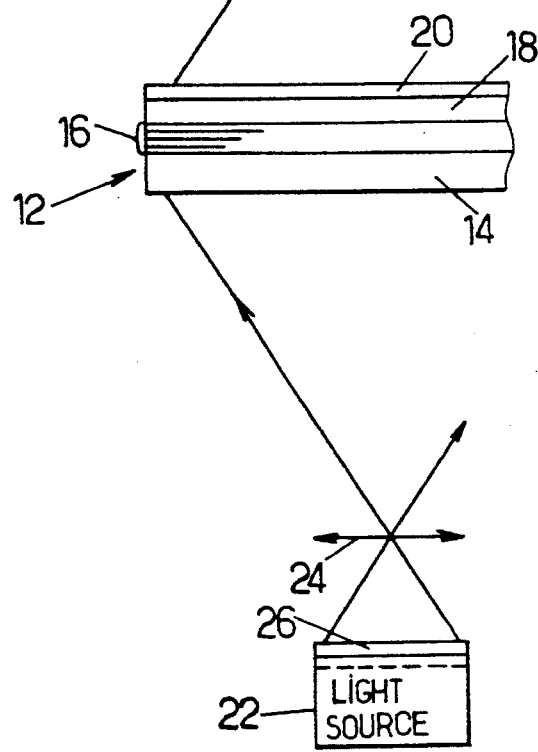

TRANSFLECTIVE COLOUR FILTER, AND A METHOD OF MANUFACTURING SUCH A FILTER

BACKGROUND OF THE INVENTION

The present invention relates to "transflective" optical filters, i.e. filters that are suitable for being observed in transmissive mode when backlighted by a source of light placed on the opposite side to the observer, and in reflective mode when lighted via the front face, e.g. by ambient light.

A particulary important, but not exclusive, application of the invention lies in making automobile dashboard panels. By day, the panel is not backlighted. Marking (dials for a revolution counter, a speedometer a fuel gauge) must appear to the driver as bright marks on a dark background, generally white on black. Alarm indicators should be difficult to see or invisible so long as the panel is not backlighted at their locations. At night, the panel is backlighted and the markings should appear in coloured form, frequently green or orange. When an indicator is activated, it should also appear coloured on a black background, and the colour is frequently red for an alarm indicator.

At present, such panels are generally made by multi-pass silkscreen printing. To do this, a sheet of translucent plastics material is used on which the various coloured layers are printed in succession (red, green and yellow layers, in general, when it is desired to have a complete palette of colours available). Thereafter, a non-coloured diffusing layer is formed by silkscreen printing. Finally, a mask is deposited by silkscreen printing, with the markings remaining transparent while the remaining surfaces are opaque.

The limitations inherent to multi-pass silkscreen printing mean that it is then necessary to use at least seven silkscreen passes. The limit resolution possible with this technology is of the order of 100 microns.

A method is also known of manufacturing a multicoloured filter array for a liquid crystal display (document EP 341348). That array is made up of two portions. The first portion constitutes a polychromatic "slice" that is exposed on a backing and is then peeled apart. The second portion is made separately and constitutes a black contour line pattern. Thereafter, the first portion is fixed on the second portion.

SUMMARY OF THE INVENTION

An object of the present invention is to provide a transflective coloured optical filter suitable for being made more simply than with conventional methods and that furthermore makes it possible to achieve better resolution, should that be necessary.

To this end, there is provided, in particular, a transflective optical filter comprising: a single transparent or translucent substrate; a coloured slice made up of layers, each corresponding to one colour out of at least two colours; a light diffusing layer; and an opaque mask on which the marks to be displayed in colour are represented by transparent zones, the coloured slice and the mask being constituted by photographic emulsions.

The relative arrangement of the various layers and of the mask does not necessarily correspond to the order recited above.

In general, the slice comprises three-colour emulsions enabling additive colour synthesis to be performed, although other solutions are possible; the transparent zones of the mask are generally not colored, enabling the mask to be made from a black-and-white emulsion, giving rise only to opaque zones and to zones that are transparent over the entire visible spectrum that can be synthesized by the dies in the slice.

Nevertheless, it is also possible to make a mask in which certain indications appear in colour, e.g. important symbols or reference marks, such as speed limits in built up areas, on ordinary roads, and on motorways.

The invention also provides a method for making a transflective filter of the kind defined above including the steps of:

providing a photographic film having a substrate, a photosensitive slice containing die precursors for at least two colours, a diffusing layer, and a monochrome photosensitive layer;

exposing the slice through a first master with a light flux containing energy at the exposure wavelengths of said precursors, and exposing the layer through a master (negative or positive for the markings) as appropriate, so as to make the layer opaque except in areas that correspond to the markings that are to be visible in reflective mode; and developing said film.

In an advantageous embodiment of the invention, the slice is covered by the diffusing layer and by the monochrome photosensitive layer. Under such circumstances, the diffusing layer must be permeable to developing agents. In general, the slice is then exposed through the substrate while the mask is exposed directly, thus by light directed in the opposite direction to the light used for exposing the slice. The mask is then made up of a layer of emulsion that is insensitive to the wavelengths present in the light used for exposing the slice, for example an emulsion may be used whose sensitivity lies in the ultra-violet range, and the emulsion of the mask is exposed using light that contains energy in the appropriate range. If this includes ultra-violet energy, it is possible to use a diffusing layer that absorbs ultra-violet so as to protect the die precursors in the slice from ultra-violet radiation, should that be necessary. Nevertheless, this precaution is not necessary in general, given the presence of light absorbing separating layers in colour emulsions and/or the narrow spectrum of sensitivity of the die precursors.

The invention makes it possible to reduce the time required for manufacturing a filter very greatly since only two or even just one operation suffices (assuming that the slice and the monochrome photosensitive layer are exposed simultaneously). In addition, the marking may be very fine, having a width of a few microns only, should that be necessary.

When a filter of the above-defined type is used in transmissive mode, any lack of uniformity in the backlighting source will give rise to markings of irregular brightness. To compensate for the non-uniform character of the lighting, it is possible to cause the optical density of the emulsions in the coloured slice to vary over the area of the filter in such a manner as to compensate for the variations in the lighting provided by the light source over that area. This result can easily be obtained by exposing the slice through a negative or master of complementary colours that is obtained photographically from lighting that reproduces the lighting provided by the source that is to be used in transmission mode. Such a negative or master can be obtained, in particular, by implementing the method described and claimed in French patent application No. 92 14118.

The invention will be better understood from the following description of a particular embodiment given by way of example.

BRIEF DESCRIPTION OF THE DRAWINGS

FIG. 1 shows a fragment of a transflective filter suitable for use as a front panel in a dashboard, shown as it appears when lighted from its front face, with black portions being represented by dense cross hatching; and FIG. 2 shows one possible way of making a photographic film suitable for manufacturing a transflective optical filter of the invention, together with the way in which it can be exposed in a single step, this figure not being drawn to scale for more clarity.

DETAILED DESCRIPTION

As an example, FIG. 1 shows the appearance of a fraction of a transflective filter constituting a front panel for a dashboard, and as it is seen under natural light, i.e. when lighted from the front. It has an opaque background that looks black and on which markings appear in white since they are constituted by transparent areas through which the observer sees a diffusing layer.

When the filter is backlighted, markings that are for indicative purposes and that are seen in white on a black background in daylight, now appear in colour, e.g. green or orange. Other markings which constitute alarms, e.g. temperature alarm mark 10, are provided with special backlighting means to cause them to appear in some other colour, generally red, in the event that they are triggerred, with this red appearance being visible both by day and by night, transmissive mode being used in both cases.

The filter may be made up starting from a photographic film 12 having a substrate 14 that is transparent or at least translucent (e.g. an acetate film) and carrying a plurality of photosensitive layers. In the example shown in FIG. 2, the photosensitive layers are designed to enable three-colour display to be performed by additive synthesis, and together they make up a slice 16 having three layers containing precursors suitable for giving rise to yellow, green, and red dies after being developed. The slice 16 is covered with a uniform light-diffusing layer 18 that is permeable to developping agents and to fixing agents, and finally by a layer 20 of monochrome photosensitive emulsion, generally black and white.

The film made up in this way is subsequently subjected to two exposures, simultaneous or otherwise, prior to being developped.

One exposure is performed from its back face by means of a light source 22 that provides light that is white or that at least contains energy in the wavelength to which the die precursors are sensitive, said light being passed through a projection system 24 and through a negative mask 26. This exposure is for forming a latent image on the slice 16. To prevent effect of the photo exposure on the photosensitive layer 20, the layer 20 is advantageously constituted by an emulsion that is responsive only to wavelength in a different range. For example, the layer 20 may contain precursors that respond only to ultra-violet light. It then suffices to place a filter that stops ultra-violent light on the path of the light flux coming from the source 22 which is constituted by an optical system that provides light flux that is as uniform as possible.

The other exposure is performed by means of another source 30, in front of the film, through an optical system 32 and a negative mask 34 that contains the markings which are to be observed in reflective mode.

The film is then developed by a method which may be conventional.

To compensate for non-uniformity in the backlighting of the filter when used at night, it suffices to expose the slice 16 with a variable light flux. The density of the colours that are obtained after development can be modulated by adjusting the quantity of light received and by using identical developing conditions for the entire emulsions.

This effect can be achieved, in particular, by means of a black and white transparency obtained with the light source used for backlighting. Once such a transparency has been made using a specific source, it can be reused in the manufacture of all filters that are designed to be used with sources of the same kind. The transmission coefficient of the transparency varies over its area in a manner that is correlated to the flux distribution from the backlighting source. The emulsions are then exposed through the master and through the transparency.

The invention is not limited to the particular embodiments described by way of example. For example, it is possible to alter the disposition of the layers, and to use the following disposition:

support film 12 colour slice 16 diffusing layer 18 opaque mask 20, or else:

colour slice 16 support film 12 diffusing layer 18 opaque mask 20.

The films used may be of the reversible type rather than of the type that is exposed through a negative.

We claim:

1. A transflective optical filter comprising:

a single transparent or translucent substrate;

a coloured slice carried by said substrate and made of a plurality of superimposed layers, each of said layers corresponding to one colour out of at least two colours;

a light diffusing layer; and an opaque mask having transparent zones defining observable marks;

said coloured slice and said opaque mask consisting of photographic emulsions, whereby said transparent zones appear in colour when said transflective optical filter is backlighted by a source of light placed on a side opposite to an observer and appear white in reflective mode when lighted via a front face.

2. Filter according to claim 1, wherein the coloured slice comprises three-colour emulsions enabling additive colour synthesis to be performed.

3. Filter according to claim 1, wherein the slice, the diffusing layer and the opaque mask are located in that order and the diffusing layer is of a material permeable to photographic developing and fixing agents.

4. Filter according to claim 1, wherein said opaque mask is made of an additional layer containing a photographic emulsion insensitive to wavelengths present in light used for exposing the slice.

5. A transflective optical filter according to claim 1, wherein said marks represent dials and alarm indicators of a dashboard panel.

6. A transflective filter according to claim 1, wherein said coloured slice has a colour in some of said zones different from a colour thereof in other ones of said zones for said marks to be seen in different colours when said filter is backlighted by white light.

* * * * *